US012759800B2

(12) United States Patent
Suchý

(10) Patent No.: US 12,759,800 B2
(45) Date of Patent: Oct. 13, 2026

(54) GUARD ASSEMBLY FOR A CONVEYOR SYSTEM

(71) Applicant: Intelligrated Headquarters, LLC, Mason, OH (US)

(72) Inventor: Jan Suchý, Zlín (CZ)

(73) Assignee: Intelligrated Headquarters, LLC, Mason, OH (US)

( * ) Notice: Subject to any disclaimer, the term of this patent is extended or adjusted under 35 U.S.C. 154(b) by 58 days.

(21) Appl. No.: 18/591,532

(22) Filed: Feb. 29, 2024

(65) Prior Publication Data

US 2025/0276854 A1 Sep. 4, 2025

(51) Int. Cl.
*B65G 21/20* (2006.01)
*B65G 13/07* (2006.01)
*B65G 47/66* (2006.01)

(52) U.S. Cl.
CPC ............. *B65G 21/20* (2013.01); *B65G 47/66* (2013.01); *B65G 13/07* (2013.01)

(58) Field of Classification Search
CPC ......... B65G 21/20; B65G 47/66; B65G 13/07
USPC .......................................................... 198/600
See application file for complete search history.

(56) References Cited

U.S. PATENT DOCUMENTS 2,624,444 A * 1/1953 Casabona .............. B65G 47/66 198/600
5,971,129 A * 10/1999 Stawniak ................ B66B 29/08 198/324
7,284,658 B2 10/2007 Wiggins et al.
7,882,944 B1 2/2011 Eubanks et al.
8,365,899 B2 2/2013 McKee
9,027,738 B2 * 5/2015 Coen ...................... B65G 37/00 198/605
9,452,896 B2 * 9/2016 Lee ........................ B65G 37/00
9,663,306 B2 * 5/2017 Pettinga ................. B65G 47/66

(Continued)

FOREIGN PATENT DOCUMENTS

CA 2755249 A1 9/2010
CN 110691744 A 1/2020

(Continued)

OTHER PUBLICATIONS

U.S. Non-Provisional Utility Patent Application for "Guard Apparatus for a Conveyor System", unpublished (Filed Feb. 29, 2024), Jan Suchý (Inventor), Intelligrated Headquarters, LLC (Applicant), U.S. Appl. No. 18/591,544.

(Continued)

*Primary Examiner* — Mark A Deuble
(74) *Attorney, Agent, or Firm* — Alston & Bird LLP

(57) ABSTRACT

Various embodiments are directed to a guard assembly for a conveyor system. The conveyor system includes a plurality of rollers rotatably disposed between a pair of side frames of the conveyor system. The guard assembly includes a top cover and a holder such that the top cover is disposed in a gap between two adjacent rollers of the plurality of rollers of the conveyor system; the holder is detachably coupled to the top cover and is configured to secure the top cover between the two adjacent rollers of the conveyor system. The guard assembly further comprises at least one rotatable element coupled to at least one of the top cover or the holder wherein the rotatable element is configured to engage with at least one adjacent roller of the conveyor system.

15 Claims, 8 Drawing Sheets

(56) References Cited

U.S. PATENT DOCUMENTS

| | | | | |
|---|---|---|---|---|
| 9,758,317 | B2 * | 9/2017 | Sammauro | B65G 15/62 |
| 10,556,755 | B2 | 2/2020 | Pettinga | |
| 10,807,809 | B1 | 10/2020 | Deboer et al. | |
| 11,597,604 | B1 | 3/2023 | Simon | |
| 11,629,010 | B1 * | 4/2023 | DeFant | B65G 13/07 198/790 |
| 11,661,283 | B2 | 5/2023 | Pettinga | |
| 12,286,302 | B2 * | 4/2025 | Pettinga | B65G 13/07 |
| 12,365,549 | B2 | 7/2025 | Drummond | |
| 12,378,083 | B2 | 8/2025 | Pettinga | |
| 2010/0108467 | A1 * | 5/2010 | Barreyre | B60S 3/004 198/850 |
| 2010/0230247 | A1 | 9/2010 | Mckee | |
| 2011/0132725 | A1 | 6/2011 | Marshall et al. | |
| 2012/0227232 | A1 | 9/2012 | Jabber et al. | |
| 2019/0002210 | A1 | 1/2019 | Hekman et al. | |
| 2021/0179365 | A1 | 6/2021 | Pettinga | |
| 2022/0169454 | A1 | 6/2022 | Schroader | |
| 2023/0098268 | A1 | 3/2023 | Pettinga | |
| 2023/0278808 | A1 | 9/2023 | Pettinga | |
| 2023/0312269 | A1 | 10/2023 | Guruswamy et al. | |
| 2023/0365346 | A1 | 11/2023 | Dietrick, III | |
| 2024/0034570 | A1 * | 2/2024 | Berenbach | B65G 47/66 |
| 2025/0276852 | A1 | 9/2025 | Suchý | |
| 2025/0276855 | A1 | 9/2025 | Suchý | |

FOREIGN PATENT DOCUMENTS

| | | | |
|---|---|---|---|
| DE | 1602097 | A1 | 4/1970 |
| DE | 19858521 | A1 | 6/2000 |
| DE | 102019101473 | A1 | 7/2020 |
| EP | 2455307 | A1 | 5/2012 |
| EP | 3699113 | A1 | 8/2020 |
| KR | 10-2022-0124440 | A | 9/2022 |
| WO | 2020/136799 | A1 | 7/2020 |
| WO | 2025/024451 | A1 | 1/2025 |

OTHER PUBLICATIONS

U.S. Non-Provisional Utility Patent Application for “Guard Assembly for a Conveyor System”, unpublished (Filed Feb. 29, 2024), Jan Suchý (Inventor), Intelligrated Headquarters, LLC (Applicant), U.S. Appl. No. 18/591,511.

Extended European Search Report Mailed on Jul. 8, 2025 for EP Application No. 25157061, 11 page(s).

Extended European Search Report Mailed on Jul. 14, 2025 for EP Application No. 25154220, 10 page(s).

Non-Final Rejection Mailed on Oct. 9, 2025 for U.S. Appl. No. 18/591,511, 6 page(s).

Notice of Allowance and Fees Due (PTOL-85) Mailed on Jul. 22, 2025 for U.S. Appl. No. 18/591,544, 7 page(s).

Notice of Allowance and Fees Due (PTOL-85) Mailed on Feb. 24, 2026 for U.S. Appl. No. 18/591,511, 5 page (s).

* cited by examiner

GUARD ASSEMBLY FOR A CONVEYOR SYSTEM

FIELD OF THE INVENTION

Various embodiments described herein relate generally to a material handling system for handling objects and, more particularly, to apparatuses for use with a conveyor system configured to facilitate transportation of objects along a conveyor surface.

BACKGROUND

Generally, in material handling environments like, but not limited to, distribution centers, warehouses, inventories, or shipping centers, a material handling system can convey, handle, sort, and organize various type of articles (for example objects, cartons, cases, containers, shipment boxes, totes, packages, and/or the like) using one or more conveyor systems. Through applied effort, ingenuity, and innovation, many of these identified problems have been solved by developing solutions that are included in embodiments of the present disclosure, many examples of which are described in detail herein.

SUMMARY

According to an embodiment of the present disclosure, a guard assembly for a conveyor system is provided. In various embodiments, the conveyor system includes a plurality of rollers rotatably disposed between a pair of side frames of the conveyor system. In various embodiments, the guard assembly includes a top cover and a holder such that the top cover is disposed in a gap between two adjacent rollers of the plurality of rollers of the conveyor system; the holder is detachably coupled to the top cover; the holder is configured to secure the top cover between the two adjacent rollers of the conveyor system. The guard assembly further includes at least one rotatable element coupled to one of the top cover or the holder wherein the rotatable element is configured to engage with at least one adjacent roller of the conveyor system.

In various embodiments, the rotatable element includes a cylinder extending along a length of the adjacent roller of the plurality of rollers. In various embodiments, a diameter of the cylinder is in a range between 30 mm to 100 mm, and a length of the cylinder is in a range between 50 mm to 3000 mm.

In various embodiments, the rotatable element is configured to rotate about an axis based on the engagement with the adjacent roller of the conveyor system.

According to another embodiment of the present disclosure, a top cover for a guard assembly for a conveyor system is provided. The top cover includes a bottom wall, first sidewall, a second sidewall and a first rotatable element coupled to one of the first sidewall or the second sidewall. The first rotatable element is configured to engage with an adjacent roller of the conveyor system. The bottom wall extends along a portion of a distance between the side frames of the conveyor system such that the bottom wall is located in a gap between adjacent rollers of the plurality or rollers. The first and the second sidewall extend from the bottom wall.

In various embodiments, the first sidewall of the top cover includes a first inclined wall extending from the bottom wall and a first flange extending substantially horizontally from the first inclined wall. The second sidewall of the top cover includes a second inclined wall extending from the bottom wall and a second flange extending substantially horizontally from the second inclined wall. The first rotatable element is coupled to one of the first flange or the second flange of the top cover.

In various embodiments, the first rotatable element includes a cylinder extending along a length of the adjacent roller of the plurality of rollers. In various embodiments, a diameter of the cylinder is in a range between 30 mm to 100 mm, and a length of the cylinder is in a range between 50 mm to 3000 mm.

In various embodiments, the first rotatable element is configured to rotate about an axis based on the engagement with the adjacent roller of the conveyor system.

In various embodiments, the top cover further includes a second rotatable element coupled to one of the first flange or the second flange of the top cover.

According to yet another embodiment of the present disclosure, a holder for a guard assembly for a conveyor system is provided. The holder includes a base wall, a first arm extending from a first side of the base wall, a second arm extending from a second side of the base wall and a third rotatable element coupled to one of the first arm or the second arm of the holder such that the third rotatable element is configured to engage with an adjacent roller of the conveyor system.

In various embodiments, the third rotatable element includes a cylinder extending along a length of the adjacent roller of the plurality of rollers. In various embodiments, a diameter of the cylinder is in a range between 30 mm to 100 mm, and a length of the cylinder is in a range between 50 mm to 3000 mm.

In various embodiments, the third rotatable element is configured to rotate about an axis based on the engagement with the adjacent roller of the conveyor system.

In various embodiments, the holder includes at least one support rib extending between the first arm and the second arm.

In various embodiments, the base wall includes a plurality of protrusions configured to prevent rotation of a fastener disposed therebetween.

In various embodiments, the holder further includes a fourth rotatable element coupled to one of the first arm or the second arm of the holder.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Same numbers are used throughout the figures to reference like features and components. Embodiments incorporating teachings of the present disclosure are shown and described with respect to the figures presented herein, in which.

DETAILED DESCRIPTION

Figure 1A:
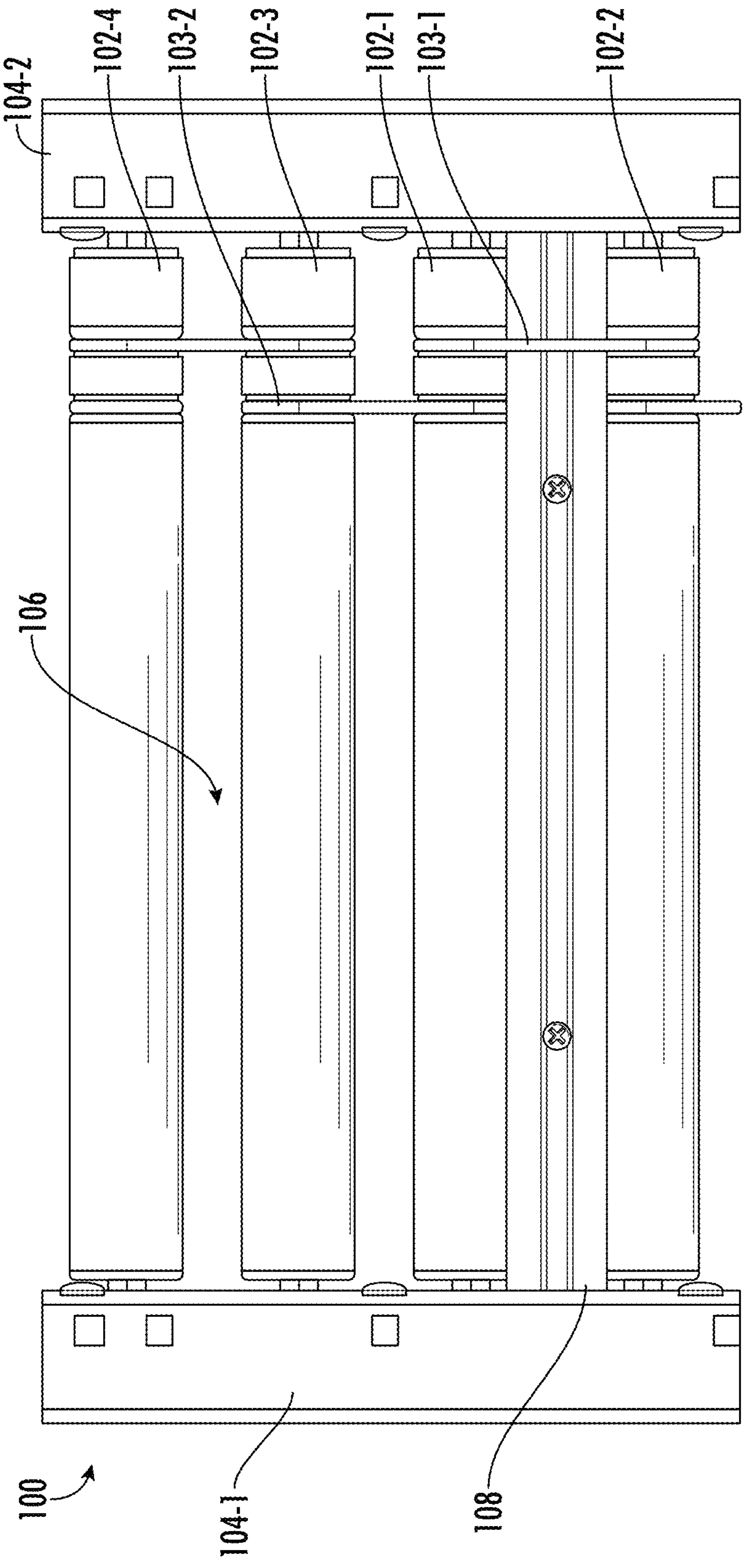
FIG. 1A illustrates a top view of a conveyor system, in accordance with various embodiments of the present disclosure.

Indeed, various embodiments may be embodied in many different forms and should not be construed as limited to the embodiments set forth herein. Other embodiments, and modifications and improvements of the described embodiments, will occur to those skilled in the art and all such other embodiments, modifications and improvements are within the scope of the present disclosure. Features from one embodiment or aspect may be combined with features from any other embodiment or aspect in any appropriate combination. For example, any individual or collective features of method aspects or embodiments may be applied to apparatus, product or component aspects or embodiments and vice versa. Like numbers refer to like elements throughout.

It should be understood at the outset that, although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations. The phrases "in an embodiment," "in some embodiments," "according to one embodiment," "in various embodiments" and the like generally mean that a particular feature, structure, or characteristic following the phrase may be included in at least one embodiment of the present disclosure or may be included in more than one embodiment of the present disclosure (importantly, such phrases do not necessarily refer to the same embodiment).

As used herein, directional terms used to describe a component, configuration, action, position, direction, and/or the like (for example, "rearward," "an upward vertical direction," "laterally outward," "bottom," "top," and the like) are meant to be interpreted relative to a hypothetical conveyor system provided on an at least substantially flat horizontal surface, but the terms are not to be interpreted as requiring the conveyor system to be in this orientation at any particular time.

If the specification states a component or feature "may," "can," "could," "should," "would," "preferably," "possibly," "typically," "optionally," "for example," "often," or "might" (or other such language) be included or have a characteristic, that specific component or feature is not required to be included or to have the characteristic. Such a component or feature may be optionally included in some embodiments, or it may be excluded.

Conveyor systems may be used in, for example, industrial manufacturing and packaging applications to facilitate the transportation of objects to a desired downstream location within a factory or a warehouse. For example, conveyor systems can include a plurality of cylindrical rollers disposed parallel and adjacent to each other along a length of the conveyor system. The plurality of rollers is arranged relative to one another such that the respective rolling surfaces of the rollers collectively define a conveyor path along which an object may be, at least, continuously transported towards the downstream location. Each roller can rotate about an axis thereof to help transfer objects disposed thereon to an adjacent roller and, in doing so, together, the plurality of cylindrical rollers supports in transferring the objects along a conveyor travel path towards an end of the conveyer system. Further, the conveyor systems include conveyor frame(s) having various structural components, such as, for example, but not limited to, sidewalls, panels, and/or the like, which are assembled relative to one another to define extremes capable of supporting the plurality of rollers therebetween.

In some examples, a guard apparatus may be installed within the conveyor system, by being secured relative to the side frames of the conveyor system, to prevent unauthorized and/or unintended access to an internal portion of the conveyor system, via a gap between any two adjacent rollers of the conveyor system. The guard apparatus may also prevent accumulation of debris, or small articles (such as fastener or coins) which may affect operation of the conveyor system. Further, the guard apparatus may also prevent accidental finger injury of an operator handling the objects on the conveyor system.

Additionally, the guard apparatus is subjected to repeated loading cycles, leading to localized deformations. Such deformations may cause a loosening of the guard apparatus installed within the conveyor system, which may result in undesirable movement thereof relative to the conveyor frame, undesirable noise (for example, rattling), partial inoperability of the guard apparatus, and/or unintentional disassembly of the guard apparatus relative to the conveyor system. Often, frictional force is developed between the rotating rollers and the conventional guard apparatus, resulting in reduced life and reliability thereof, undesirable loosening of the guard apparatus, and/or unintentional breakage of the guard apparatus. The conventional guard apparatus is known to include complicated profiles configured to address issues resulting from the development of the friction as mentioned herein. However, such complicated profiles of the guard apparatus increase design complexity besides an increase in cost of manufacturing.

Various embodiments of the present disclosure are directed to a guard assembly for a conveyor system. The conveyor system includes a plurality of rollers rotatably disposed between a pair of side frames of the conveyor system. In various embodiments, the guard assembly includes a top cover and a holder such that the top cover is disposed in a gap between two adjacent rollers of the plurality of rollers of the conveyor system. The holder is detachably coupled to the top cover and is configured to secure the top cover between the two adjacent rollers of the conveyor system. The guard assembly further includes at least one rotatable element coupled to one of the top cover or the holder wherein the rotatable element is configured to engage with at least one adjacent roller of the conveyor system.

FIG. 1A illustrates a top view of a conveyor system 100, in accordance with various embodiments of the present disclosure. The conveyor system 100 includes a plurality of rollers 102 (such as a first roller 102-1, a second roller 102-2, a third roller 102-3, and a fourth roller 102-4), hereinafter alternatively, individually, and collectively referred to as "the roller(s) 102" or "adjacent rollers 102-1, 102-2", disposed between a pair of side frames 104-1, 104-2 (hereinafter alternatively and collectively referred to as "the side frames 104"), such that a gap 106 exists between any two adjacent rollers 102-1, 102-2. For example, the gap 106 exists between two adjacent rollers 102-1, 102-2 or 102-3, 102-4. In various embodiments, the adjacent rollers 102-1, 102-2 are joined by one or more driving members 103 such as a belt or an O-ring, at one end, where the driving member 103 is configured to transmit a rotary motion from one roller to the other, without slippage.

The conveyor system 100 may include multiple such driving members, such as 103-1, 103-2 and so on, configured to connect each pair of adjacent rollers to transmit the motion throughout a length of the conveyor system 100 in order to facilitate transfer of objects. As seen in FIG. 1, a guard assembly 108 is positioned within the conveyor system 100 to provide coverage over at least a portion of the gap 106 between the two adjacent rollers 102-1, 102-2. In some embodiments, the guard assembly 108 provides coverage over an entire portion of the gap 106 between the side frames 104-1 and 104-2.

Figure 1B:
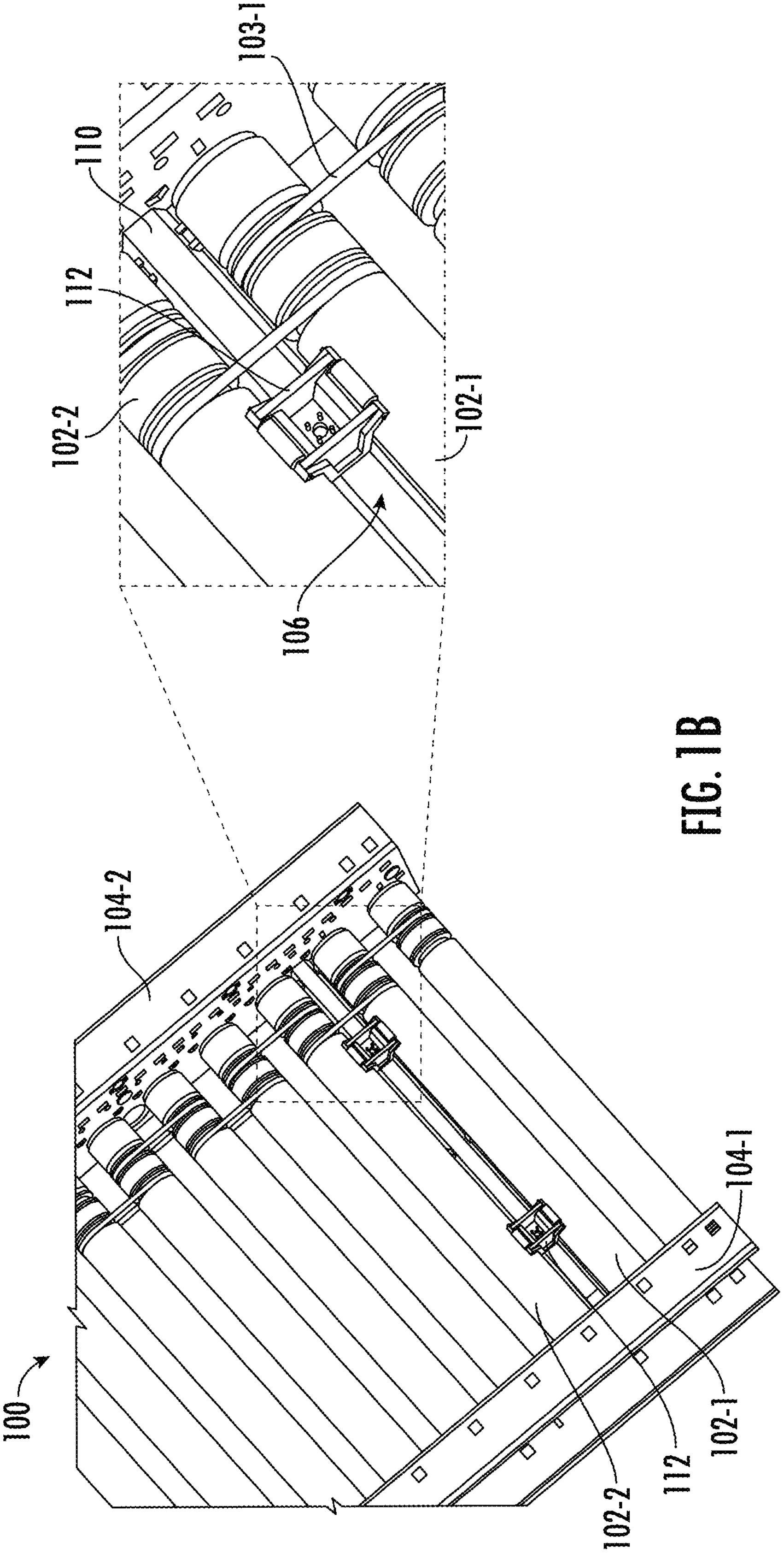
FIG. 1B illustrates a bottom perspective view of the conveyor system, in accordance with various embodiments of the present disclosure.

Referring to FIG. 1B, a bottom perspective view of the conveyor system 100 is illustrated. FIG. 1B is described in conjunction with FIG. 1A. The guard assembly 108 includes a top cover 110 and a holder 112. The top cover 110 is disposed in the gap 106 between two adjacent rollers 102-1, 102-2 of the plurality of rollers 102. The holder 112 is detachably coupled to the top cover 110 and configured to secure the top cover 110 between the two adjacent rollers 102-1, 102-2. In various embodiments, the top cover 110 extends between the side frame 104-1, 104-2 and is configured to provide coverage over the entire portion of gap 106 between the side frames 104-1, 104-2.

Figure 1C:
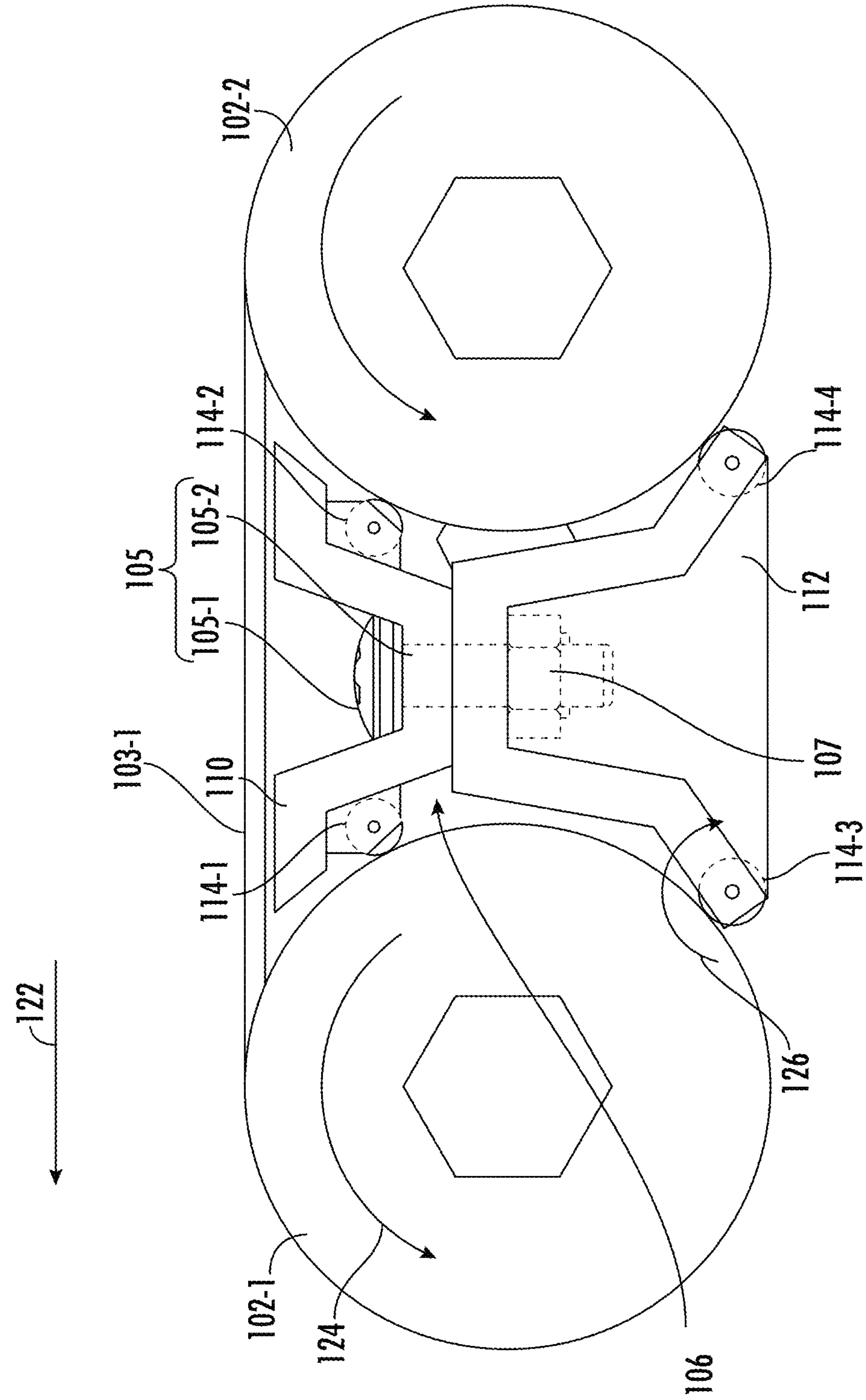
FIG. 1C illustrates a front view of a guard assembly and two adjacent rollers of the conveyor system, in accordance with various embodiments of the present disclosure.

Referring to FIG. 1C, a front view of the guard assembly 108 and the two adjacent rollers 102-1, 102-2 of the conveyor system 100 is illustrated. FIG. 1C is described in conjunction with FIG. 1A and FIG. 1B. As stated above, the holder 112 is detachably coupled to the top cover 110 and configured to secure the top cover 110 between the two adjacent rollers 102-1, 102-2. In some embodiments, a first fastener 105, such as a screw or a bolt, defining a head 105-1 and a shank 105-2 is used in combination with a second fastener 107, such as a nut, to secure the top cover 110 and the holder 112. In some embodiments, the top cover 110 is disposed below the driving member 103-1. As such, a top surface of the top cover 110 is located at a distance from the driving member 103-1, thereby preventing potential friction development between the top cover 110 and the driving member 103-1. In some embodiments, the guard assembly 108 includes at least one rotatable element 114 coupled to at least one of the top cover 110 or the holder 112. For example, the guard assembly 108 includes a plurality of rotatable elements 114 (such as a first rotatable element 114-1, a second rotatable element 114-2, a third rotatable element 114-3 and a fourth rotatable element 114-4), hereinafter alternatively, individually, and collectively referred to as "the rotatable element(s) 114".

In an installed condition of the guard assembly 108, the rotatable element 114 is configured to engage with at least one adjacent roller 102-1, 102-2 of the conveyor system 100. As used hereinafter, the term "installed condition" refers to the conveyer system 100 including the guard assembly 108 disposed in the gap 106 between the adjacent rollers 102-1 and 102-2, as illustrated in FIG. 1C. In various embodiments, the rotatable element 114 defines a diameter "D" and a length "L". In the illustrated embodiments, the rotatable element(s) 114 is implemented as a cylinder extending along a length of the adjacent roller 102-1, 102-2 of the plurality of rollers 102.

In an operating condition of the conveyor system 100, to transfer one or more object along a length direction 122 of the conveyor system 100, the adjacent rollers 102-1 and 102-2 rotates in a first direction 124, as shown in FIG. 1C. As used hereinafter, the term "operating condition" refers to the conveyor system 100 with the plurality of rollers 102 rotating about each of their axis in order to transfer the one or more objects.

As shown in FIG. 1C, the top cover 110 includes the rotatable elements 114-1 and 114-2 coupled to either side thereof and configured to engage with the adjacent rollers 102-1 and 102-2, respectively, in the installed condition. Similarly, the holder 112 includes the rotatable elements 114-3 and 114-4 coupled to either side thereof and configured to engage with the adjacent rollers 102-1 and 102-2, respectively, in the installed condition. As shown in FIG. 1C, in the installed condition, the diameter of the rotatable elements 114-1, 114-2, 114-3, 114-4 determines the position of the top cover 110 with respect to the adjacent rollers 102-1, 102-2. For example, as may be observed in FIG. 1C, with an increase in diameter of the rotatable elements 114-1 and 114-2, the top cover 110 may be displaced in a vertical direction with respect to the adjacent rollers 102-1 and 102-2. However, the diameter of the rotatable elements 114-1, 114-2, 114-3, 114-4 may be pre-determined to prevent contact between the top cover 110 and the adjacent rollers 102-1, 102-2, and between the top cover 110 and the driving member 103-1. This way, during the operating condition, the frictional forces generated between the top cover 110 and the adjacent rollers 102-1, 102-2 may be eliminated. In various embodiments, the diameter "D" of the cylinder is in a range of about 30 mm to 100 mm, and the length "L" of the cylinder is in a range of about 50 mm to 3000 mm.

In various embodiments, in the operating condition, the rotatable elements 114-1 and 114-3 engage with the adjacent roller 102-1 and rotate about their respective axis in a second direction 126 opposite to the first direction 124, the rotatable elements 114-2 and 114-4 engage with the adjacent roller 102-2 and rotate about their respective axis in the second direction 126. As the rotatable elements 114-1, 114-2, 114-3 and 114-4 rotate along with the adjacent rollers 102-1, 102-2 in said opposing directions, a relative motion between the rotatable elements 114-1, 114-2, 114-3, 114-4 and the plurality of rollers 102 is averted, thereby minimizing the friction generated due to the contact therebetween.

Shape of the rotatable element 114 should not be construed as limited. Instead, other shapes and features will be apparent to a person skilled in the art, albeit with few changes to the features described and illustrated herein. For example, in some embodiments, the rotatable element 114 may be implemented as one of a sphere or a cone. Further, the rotatable element 114 may include multiple fillets, chamfer, or edge radii. In various embodiments, the rotatable element 114 may include plurality of hemi-spherical protrusions configured to engage with the adjacent rollers 102-1, 102-2. The hemi-spherical protrusions may be laterally spaced apart from each other and further reduce the contact area of the rotatable element 114 with the adjacent rollers 102-2, 102-2, thereby further reducing the friction generated therebetween. In various embodiments, the length "L" of the rotatable element 114 may be varied to minimize the contact area between the rotatable element(s) 114 and the plurality of rollers 102.

Figure 2A:
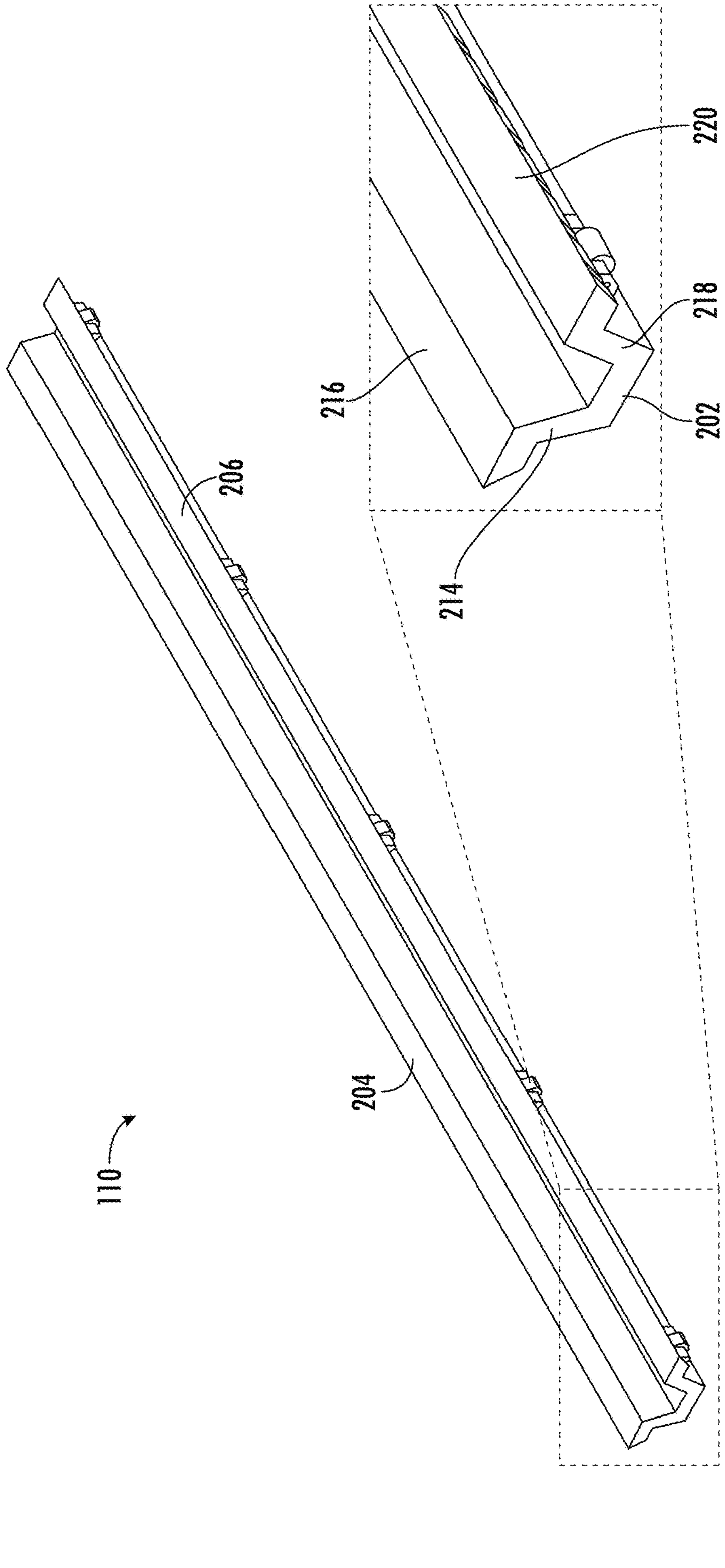
FIG. 2A illustrates a top perspective view of a top cover of the guard assembly, in accordance with various embodiments of the present disclosure.
Figure 2B:
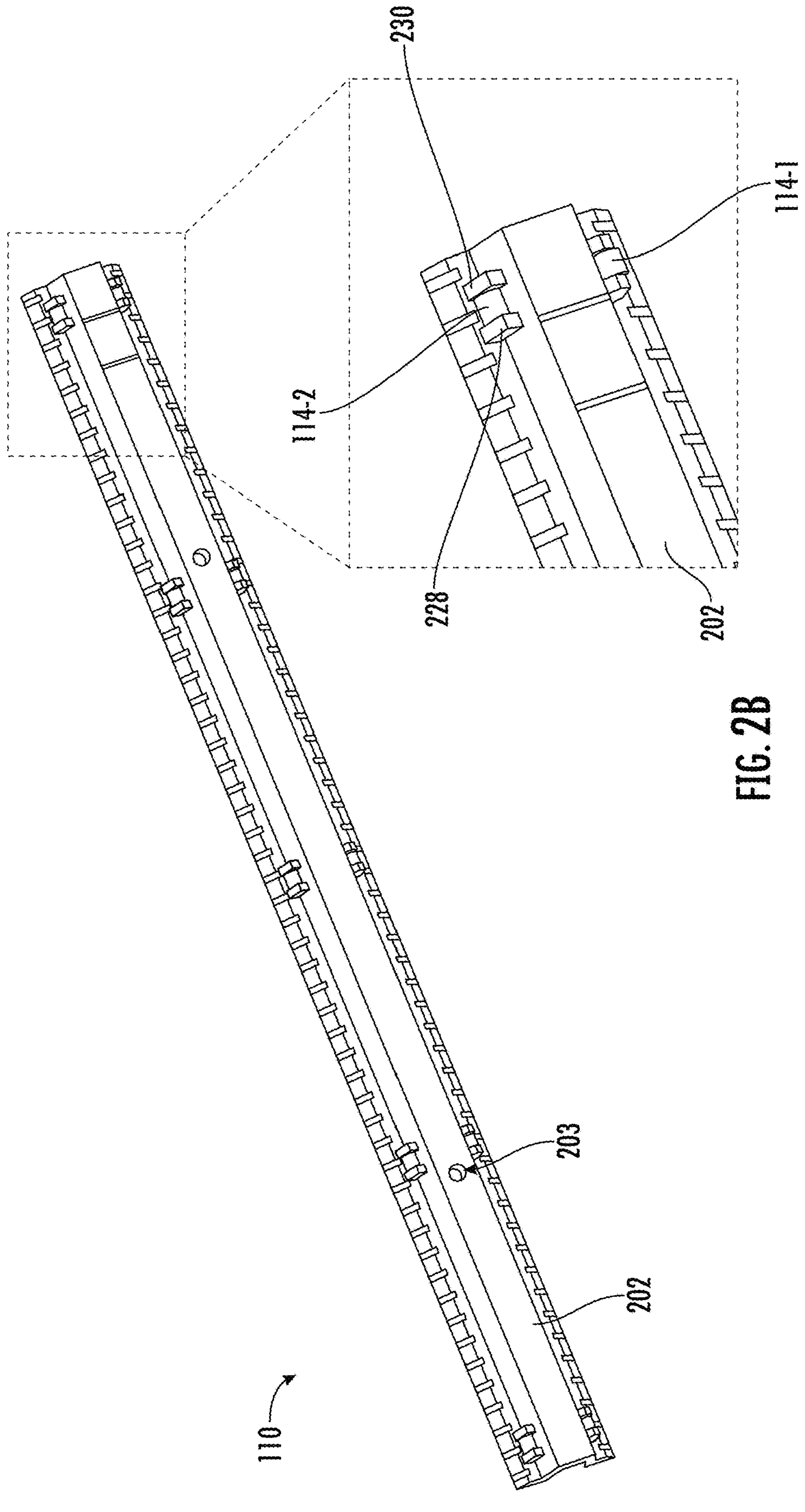
FIG. 2B illustrates a bottom perspective view of the top cover of FIG. 2A, in accordance with various embodiments of the present disclosure.

FIG. 2A illustrates a top perspective view of the top cover 110 and FIG. 2B illustrates a bottom perspective view of the top cover 110. The top cover 110 includes a bottom wall 202, a first sidewall 204 located on one side of the bottom wall 202, a second sidewall 206 located on an opposite side of the bottom wall 202, the first rotatable element 114-1 coupled to the first sidewall 204 of the top cover 110, and the second rotatable element 114-2 coupled to the second sidewall 206 of the top cover 110. The bottom wall 202 extends along a portion of a distance between the side frames 104-1, 104-2 of the conveyor system 100. The bottom wall 202 is configured to be located in the gap 106 between the adjacent rollers 102-1, 102-2. In various embodiments, the top cover 110 may be made of light-weight polymer, such as plastic, and may be manufactured through, for example, injection molding. To this end, the bottom wall 202, the first sidewall 204 and the second sidewall 206 are integrally molded to form the top cover 110. The bottom wall 202 may also define a receptacle (not shown) configured to receive the head 105-1 of the first fastener 105 therein. The bottom wall 202 may define a first hole 203 (see FIG. 2B) configured to receive the shank 105-2 of the first fastener 105 therein.

In various embodiments, the first sidewall 204 of the top cover 110 includes a first inclined wall 214 located on one side of the bottom wall 202 and a first flange 216 extending substantially horizontally from the first inclined wall 214. The second sidewall 206 of the top cover 110 includes a second inclined wall 218 located on an opposite side of the bottom wall 202 and a second flange 220 extending substantially horizontally from the second inclined wall 218. The first flange and 216 and the second flange 220 extend in opposite directions from the first inclined wall 214 and the second inclined wall 218, respectively. In some embodiments, the first rotatable element 114-1 is coupled to the first flange 216 of the top cover 110. In various embodiments, the first rotatable element 114-1 is configured to rotate about a first axis based on the engagement with the adjacent roller 102-1, 102-2 during operating condition of the conveyor system 100. In various embodiments, the top cover 110 further includes the second rotatable element 114-2 coupled to the second flange 220 of the top cover 110.

In various embodiments, the rotatable elements 114 may be disposed on either side of the top cover 110 and may be laterally spaced apart from each other. In various embodiments, a length of the top cover 110 may determine the number of rotatable elements 114 coupled thereto. To this end, the rotatable elements 114 may be uniformly disposed at pre-determined distance from each other along a length of the top cover 110. In various embodiments, the length "L" of each rotatable element 114 may be varied to vary the contact area between the rotatable element(s) 114 and the corresponding roller 102. As will be understood from the FIG. 2A read in light of FIG. 1C, increase in length of the rotatable element 114 causes an increase in area of contact with the corresponding roller 102 and, accordingly, a decrease in length of the rotatable element 114 causes a decrease in area of contact with the corresponding roller 102. As such, the number of rotatable element(s) 114 to be coupled to the top cover 110 may be determined based on the length of the top cover 110. In some embodiments, a length of one rotatable element 114 may be greater than other rotatable elements 114 coupled to the top cover 110. For example, the top cover 110 may include three rotatable elements 114 and a middle rotatable element 114 may have a length greater than lengths of the other two rotatable elements 114. In this embodiment, distances between the three rotatable elements 114 may be non-equal. In cases where the rollers 102 are tapered, such non-equal distances between the rotatable elements 114 along the top cover 110 may be implemented. Embodiments disclosed herein with respect to configuration of the rotatable elements 114 and their placement on the top cover 110 should not be construed as limited. Multiple such variations will be apparent to a person skilled in the art, based on the description herein, albeit with few variations.

Referring to FIG. 2B, in various embodiments, the top cover 110 may include a first projection 228 and a second projection 230 extending from the first sidewall 204 thereof, where the first projection 228 and the second projection 230 are parallel to each other. With aid of a first supporting pin (not shown) that extends between the first projection 228 and the second projections 230, the rotatable element 114-2 may be rotatably supported therebetween.

Shape of the illustrated top cover 110 should not be construed as limited. Instead, other shapes and features will be apparent to the person skilled in the art, albeit with few changes to the features described and illustrated herein. For example, the top cover 110 may include a U-shaped elongated wall with extending side flanges. Further, the top cover 110 may include multiple fillets, chamfer, or edge radii.

Figure 3A:
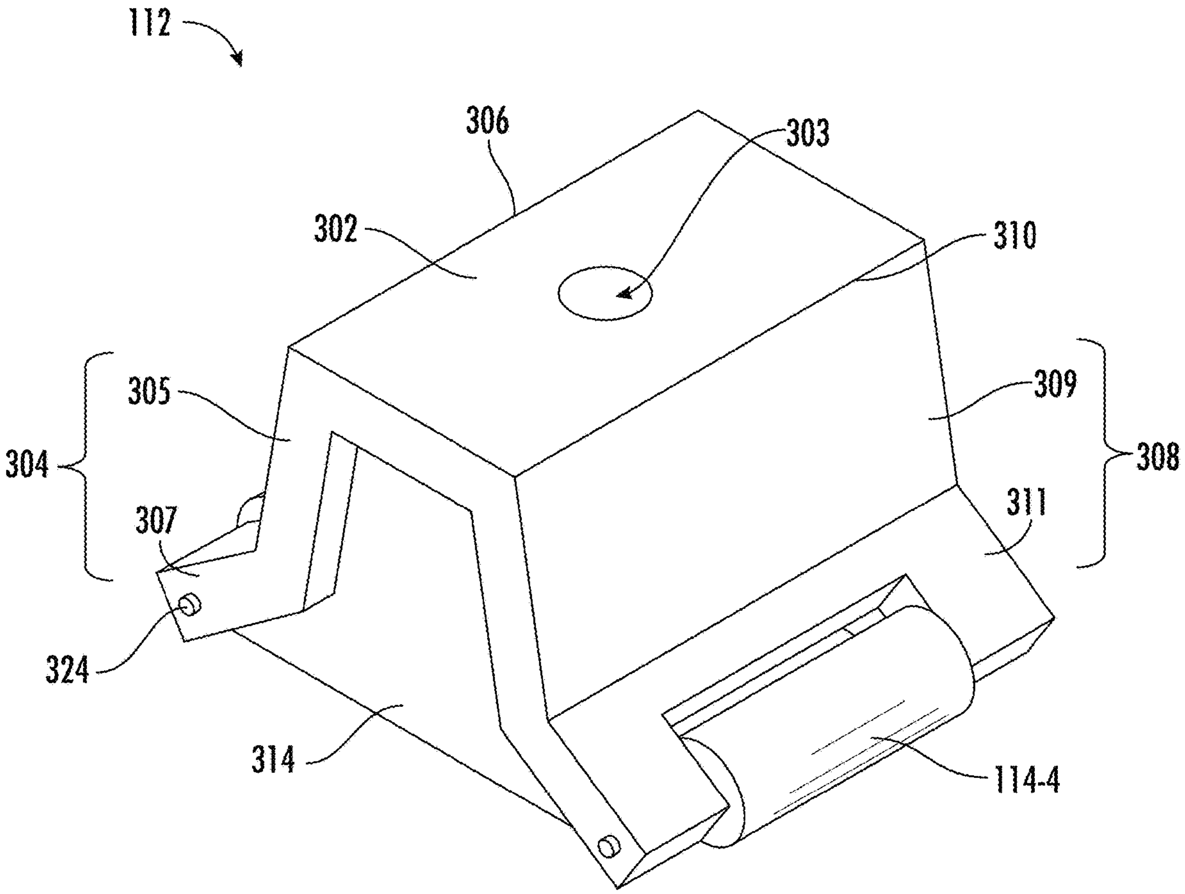
FIG. 3A illustrates a top perspective view of a holder of the guard assembly, in accordance with various embodiments of the present disclosure.

Referring to FIG. 3A, a top perspective view of the holder 112 is illustrated. The holder 112 includes a base wall 302, a first arm 304 extending from a first side 306 of the base wall 302, a second arm 308 extending from a second side 310 of the base wall 302, and the third rotatable element 114-3 (See FIG. 1C) coupled to the first arm 304 of the holder 112, such that the third rotatable element 114-3 is configured to engage with an adjacent roller 102-1 of the conveyor system 100.

Figure 3B:
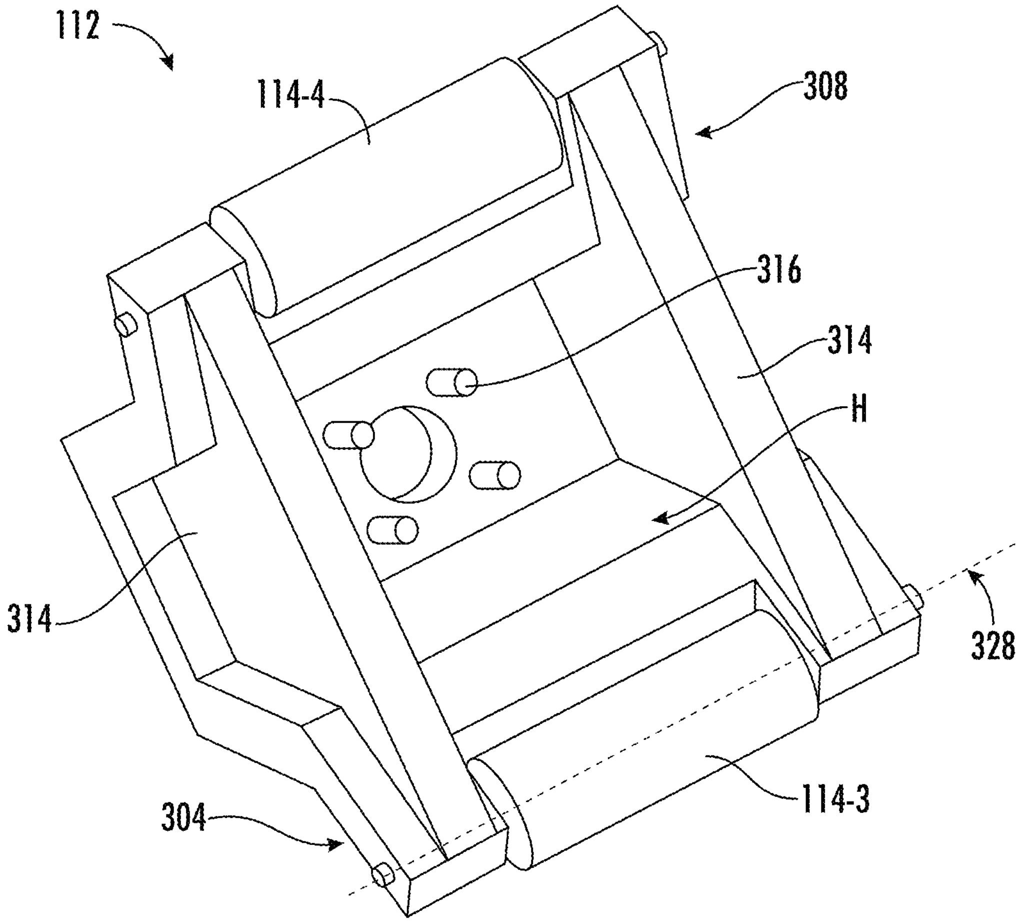
FIG. 3B illustrates a bottom perspective view of the holder of FIG. 3A, in accordance with various embodiments of the present disclosure.

Referring to FIG. 3B, a bottom perspective view of the holder 112 is illustrated. FIG. 3B is described in conjunction with FIG. 1A through FIG. 3A. In various embodiments, the third rotatable element 114-3 is configured to rotate about a third axis 328 based on the engagement with the adjacent roller 102-1 of the conveyor system 100. In various embodiments, the holder 112 includes at least one support rib 314 extending between the first arm 304 and the second arm 308. In various embodiments, the base wall 302 includes a plurality of protrusions 316 configured to prevent rotation of the second fastener 107 disposed therebetween. For example, the plurality of protrusions 316 engages, through an interference fit, with side surfaces (not shown) of the second fastener 107, such that the rotational motion of second fastener 107 is restricted. Further, the base wall 302 defines a second hole 303 configured to receive the shank 105-2 of the first fastener 105 therethrough. In various embodiments, the holder 112 further includes a fourth rotatable element 114-4 coupled to the second arm 308 thereof. In various embodiments, with the aid of a second supporting pin, the third rotatable element 114-3 is rotatably supported on the first arm 304. In some embodiments, each of the first arm 304 and the second arm 308 may include two or more rotatable elements in lieu of single rotatable element as illustrated in FIG. 3A and FIG. 3B.

In some embodiments, the first arm 304 of the holder 112 may include a first inclined portion 305 extending from the first side 306 of the base wall 302 and a second inclined portion 307 extending further divergently from the first inclined portion 305. In the illustrated embodiment, the first inclined portion 305 and the second inclined portion 307 together constitutes the first arm 304. Similarly, the second arm 308 of the holder 112 may include a third inclined portion 309 extending from the second side 310 of the base wall 302 and a fourth inclined portion 311, extending further divergently from the third inclined portion 309. In the illustrated embodiment, the third inclined portion 309 and the fourth inclined portion 311 together constitutes the second arm 308. In some embodiments, each of the first arm 304 and the second arm 308 may include multiple inclines portions. In some embodiments, the each of the first arm 304 and the second arm 308 may be implemented as arcuate portions extending respectively from the first side 306 and the second side 310 of the base wall 302. In some embodiments, the holder 112 may have a bell-shape. In various embodiments, the third rotatable element 114-3 is coupled to the second inclined portion 307 of the holder 112 and the fourth rotatable element 114-4 is coupled to the fourth inclined portion 311 of the holder 112.

In various embodiments, the holder 112 may be made of light-weight polymer, such as plastic, and may be manufactured through, for example, injection molding. To this end, the support rib 314 and the plurality protrusions 316 may be integrally formed together with the base wall 302, the first arm 304, and the second arm 308. In various embodiments, the holder 112 defines a hollow space "H" surrounded by the first arm 304, the second arm 308, and one or more support ribs 314 joining the first arm 304 and the second arm 308. Shape of the illustrated holder 112 should not be construed as limited. Instead, other shapes and features will be apparent to a person skilled in the art, albeit with few changes to the features described and illustrated herein. For example, in some embodiments, the holder 112 may include multiple fillets, chamfer, or edge radii.

The present disclosure provides an improved guard assembly for the conveyor system 100. As described above, the guard assembly 108 is reduces the frictional forces between the stationary top cover 110 and the rotating rollers, owing to the rotatable elements 114 disposed thereon. Further, since the top cover 110 provides coverage over the entire portion of the gap 106 between the side frames 104-1, 104-2, the guard assembly 108 prevents unauthorized and/or unintended access to internal portion(s) of conveyor system 100. This is achieved by, for example, The guard assembly 108 also prevents accumulation of debris, or small article, such as fasteners or coins, which may lead to jamming of the conveyor system 100. Further, the guard assembly 108 prevents finger injury by effectively, in a way, blocking the gap 106 between adjacent rollers 102-1, 102-2.

There are further advantages of the present disclosure. For example, in case of damage or deformation of any one of the rotatable elements occurring during usable life of the guard assembly 108, the need to replace the entire guard assembly 108 may be eliminated. For example, if a single rotatable element is damaged, only the rotatable element could be replaced instead of the entire top cover 110 or the holder 112, thereby minimizing the replacement costs.

Advantageously, in an event where a pull force is applied to remove or dismantle the guard assembly 108 from the conveyor system 100 in a substantially vertical direction with respect to the rollers 102, the guard assembly 108 provides an effective resistance against the pull force through vertical securing thereof. For example, the rotatable elements 114 may be configured to couple with the first arm 304 and the second arm 308 of the holder 112 at their respective distal edges, such that the rotatable elements 114 engage with the adjacent rollers 102-1, 102-2 of the conveyor system 100, thereby vertically securing the guard assembly 108 to preventing the guard assembly 108 from coming off due to an applied pull force.

Further, the plurality of protrusions 316 on the base wall 302 of the holder 112 prevent rotation of the second fastener 107 disposed therein, thereby eliminating possibility of loosening out of the top cover 110 due to repeated loading cycles.

There are further advantages of the present disclosure. For example, the rotatable elements 114 may be configured to couple with the first flange 216 of the first sidewall 204 of the top cover 110 and the second flange 220 of the second sidewall 206 of the top cover 110 at their respective distal ends, such that the rotatable elements 114 engage with the adjacent rollers 102-1, 102-2 of the conveyor system 100. This engagement provides a vertical securing of the top cover 110 as they prevent the top cover 110 from falling into the gap 106 between the adjacent rollers 102-1, 102-2.

Advantageously, the support rib 314 adds to the strength and the stiffness of the holder 112, thereby reducing localized deformations of the holder 112.

There are further advantages provided by the present disclosure. It may be desirable to manufacture the top cover 110 and the holder 112 using simpler methods, such as injection molding. The present disclosure provides a simplified structure for each of the top cover 110 and the holder 112, thereby reducing the manufacturing costs, etc. For example, the first inclined wall 214 of the first sidewall 204 and the second inclined wall 218 of the second sidewall 206 extend divergently from the bottom wall 202. Such an embodiment ensures that there is, for example, sufficient ejection or draft angle clearance in the die used for molding the component through injection molding. Moreover, the die can have a simpler profile which reduces complex man hour effort to build the die for injection molding. Thus, it is easier to manufacture the top cover 110 through an injection molding process as an integrated component.

Figure 4:
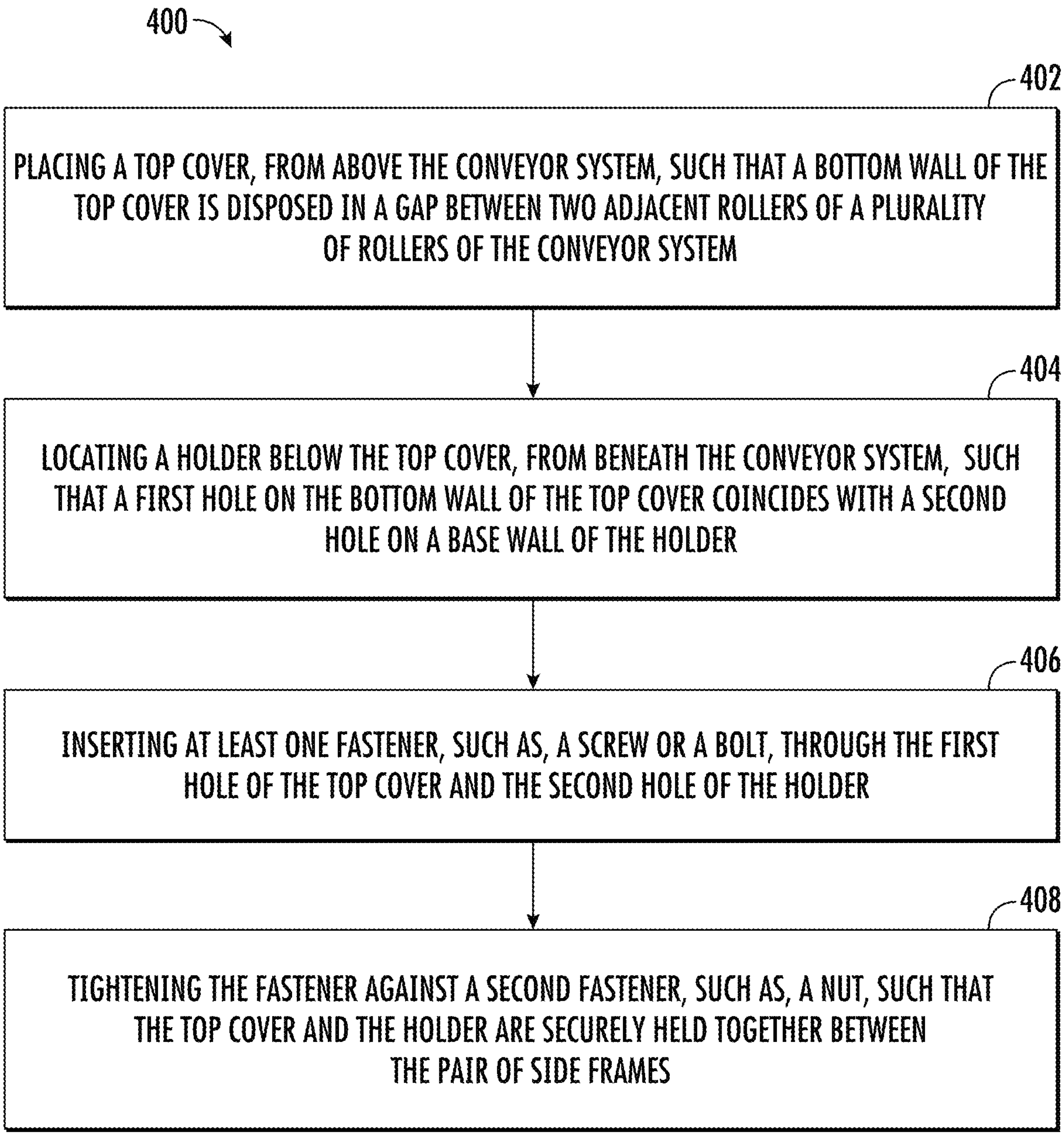
FIG. 4 illustrates a method of assembling a guard assembly on a conveyor system, according to an aspect of the present disclosure.

Various aspects of the present disclosure provide a method of assembling the guard assembly 108 on the conveyor system 100. FIG. 4 illustrates a method 400 of assembling the guard assembly 108 on the conveyor system 100. FIG. 4 is described in conjunction with FIG. 1A through FIG. 3B. At step 402, the method 400 includes placing the top cover 110, from above the conveyor system 100, such that the bottom wall 202 of the top cover 110 is disposed in the gap 106 between two adjacent rollers 102-1, 102-2 of the plurality of rollers 102 of the conveyor system 100. At step 404, the method 400 includes locating the holder 112 below the top cover 110, from beneath the conveyor system 100, such that the first hole 203 on the bottom wall 202 of the top cover 110 aligns with the second hole 303 on the base wall 302 of the holder 112. At step 406, the method 400 includes inserting the first fastener 105, such as a screw or a bolt, through the first hole 203 of the top cover 110 and the second hole 303 of the holder 112. At step 408, the method 400 includes tightening the first fastener 105 against the second fastener 107, such as a nut, so that the top cover 110 and the holder 112 are securely held together between the pair of side frames 104-1, 104-2.

The foregoing method descriptions are provided merely as illustrative examples and are not intended to require or imply that the steps of the various embodiments must be performed in the order presented. As will be appreciated by one of skilled in the art, the order of steps in the foregoing embodiments may be performed in any order. Any reference to claim elements in the singular, for example, using the articles "a," "an" or "the" is not to be construed as limiting the element to the singular.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (for example, "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Many modifications and other embodiments of the present disclosure will be apparent to one skilled in the art to which the present disclosure pertain having the benefit of teachings presented in the foregoing descriptions and the associated drawings. Although the figures only show certain components of the system described herein, it is understood that various other components may be present. Therefore, it is to be understood that the present disclosure should not be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A guard assembly for a conveyor system comprising a plurality of rollers rotatably disposed between a pair of side frames thereof, the guard assembly comprising:
- a top cover disposed in a gap between two adjacent rollers of the plurality of rollers; and
- a holder detachably coupled to the top cover, wherein the holder is configured to secure the top cover between the two adjacent rollers of the conveyor system, wherein the holder comprises a base wall, and wherein the base wall comprises a plurality of protrusions configured to prevent rotation of a fastener disposed therebetween; and
- at least one rotatable element coupled to at least one of the top cover or the holder, wherein the at least one rotatable element is configured to engage with at least one adjacent roller of the conveyor system.

2. The guard assembly of claim 1, wherein the at least one rotatable element comprises a cylinder extending along a length of the at least one adjacent roller of the plurality of rollers.

3. The guard assembly of claim 2, wherein a diameter of the cylinder is in a range between 30 mm to 100 mm, and a length of the cylinder is in a range between 50 mm to 3000 mm.

4. The guard assembly of claim 1, wherein the at least one rotatable element is configured to rotate about an axis based on the engagement with the at least one adjacent roller of the conveyor system.

5. A top cover for a guard assembly for a conveyor system comprising a plurality of rollers rotatably disposed between a pair of side frames thereof, the top cover comprising:
- a bottom wall extending along a portion of a distance between the pair of side frames of the conveyor system, wherein the bottom wall is located in a gap between adjacent rollers of the plurality of rollers;
- a first sidewall extending from the bottom wall, wherein the first sidewall comprises:
  - a first inclined wall extending from the bottom wall; and
  - a first flange extending substantially horizontally from the first inclined wall;
- a second sidewall extending from the bottom wall, wherein the second sidewall comprises:
  - a second inclined wall extending from the bottom wall; and
  - a second flange extending substantially horizontally from the second inclined wall; and
- a first rotatable element coupled to one of the first sidewall or the second sidewall of the top cover, wherein the first rotatable element is configured to engage with an adjacent roller of the conveyor system, and
- wherein the first rotatable element is coupled to one of the first flange or the second flange of the top cover.

6. The top cover of claim 5, wherein the first rotatable element comprises a cylinder extending along a length of the adjacent roller of the plurality of rollers.

7. The top cover of claim 6, wherein a diameter of the cylinder is in a range between 30 mm to 100 mm, and a length of the cylinder is in a range between 50 mm to 3000 mm.

8. The top cover of claim 5, wherein the first rotatable element is configured to rotate about a first axis based on the engagement with the adjacent roller of the conveyor system.

9. The top cover of claim 5, further comprising a second rotatable element coupled to one of the first flange or the second flange of the top cover.

10. A holder for a guard assembly for a conveyor system comprising a plurality of rollers rotatably disposed between a pair of side frames thereof, the holder comprising:
- a base wall;
- a first arm extending from a first side of the base wall;
- a second arm extending from a second side of the base wall; and
- a rotatable element coupled to one of the first arm or the second arm of the holder,
- wherein the rotatable element is configured to engage with an adjacent roller of the conveyor system, and wherein the base wall comprises a plurality of protrusions configured to prevent rotation of a fastener disposed therebetween.

11. The holder of claim 10, wherein the rotatable element comprises a cylinder extending along a length of the adjacent roller of the plurality of rollers.

12. The holder of claim 11, wherein a diameter of the cylinder is in a range between 30 mm to 100 mm, and a length of the cylinder is in a range between 50 mm to 3000 mm.

13. The holder of claim 10, further comprising at least one support rib extending between the first arm and the second arm.

14. The holder of claim 10 further comprising another rotatable element coupled to one of the first arm or the second arm of the holder.

15. The holder of claim 10, wherein the rotatable element rotates about an axis upon engagement with the adjacent roller of the conveyor system.

* * * * *